United States Patent

Hietalahti et al.

[11] Patent Number: 6,018,653
[45] Date of Patent: *Jan. 25, 2000

[54] MULTIPLE-LEVEL HOME AREA PRICING FOR CELLULAR MOBILE TELEPHONES

[75] Inventors: Hannu Hietalahti, Kiviniemi; Esa Jarvenoja, Oulu, both of Finland; Paul Solomon Meche, Richardson, Tex.

[73] Assignee: Nokia Mobile Phones, Ltd., Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/661,450

[22] Filed: Jun. 11, 1996

[30] Foreign Application Priority Data

Jun. 15, 1995 [FI] Finland ................... 952965

[51] Int. Cl.[7] ......................................... H04B 7/00
[52] U.S. Cl. ......................... 455/406; 455/408; 455/414
[58] Field of Search ..................... 455/404, 405, 455/406–407, 408–414, 561, 566, 524, 525, 432, 435

[56] References Cited

U.S. PATENT DOCUMENTS

| | | | |
|---|---|---|---|
| 4,776,000 | 10/1988 | Parienti | 455/407 |
| 4,916,728 | 4/1990 | Blair | 379/59 |
| 5,175,758 | 12/1992 | Levanto et al. | 379/57 |
| 5,233,642 | 8/1993 | Renton | 455/405 |
| 5,257,257 | 10/1993 | Chen et al. | 370/18 |
| 5,303,297 | 4/1994 | Hillis | 455/406 |
| 5,309,500 | 5/1994 | Koma et al. | 379/58 |
| 5,577,100 | 11/1996 | McGregor et al. | 455/406 |
| 5,613,204 | 3/1997 | Haberman et al. | 455/434 |
| 5,613,213 | 3/1997 | Naddell et al. | 455/414 |

FOREIGN PATENT DOCUMENTS

| | | |
|---|---|---|
| 0 427 687 A1 | 5/1991 | European Pat. Off. |
| 0 538 014 A2 | 4/1993 | European Pat. Off. |
| 0 597 638 A1 | 5/1994 | European Pat. Off. |
| WO 95/24809 | 9/1995 | WIPO |

*Primary Examiner*—Edward F. Urban
*Assistant Examiner*—Thuan T. Nguyen
*Attorney, Agent, or Firm*—Perman & Green, LLP

[57] ABSTRACT

The invention is related to a method and equipment used by a radio communication device (2) in a cellular network to determine whether a particular area specific service is applicable. A base station (6) transmits a first character sequence (4) which is advantageously a binary number. The radio communication device (2) selects on the basis of a second character sequence (5) stored in its memory (12) certain characters of the first character sequence (4) for examination. A logic AND or OR function (15–20) is performed for these characters indicating whether said service is applicable. By adding area specific character sequences (7) to the message sent by the base station (6) and making the recognition algorithms of the radio communication device more complex it is possible to establish a versatile service system with geographical and temporal variation. Said service can be, for example, area specific pricing.

16 Claims, 4 Drawing Sheets

MULTIPLE-LEVEL HOME AREA PRICING FOR CELLULAR MOBILE TELEPHONES

BACKGROUND OF THE INVENTION

The invention relates in general to the use of terminal location information in mobile telephone systems based on cellular networks and in particular to determining and indicating to the telephone user the call tariff applicable on the basis of the location of the terminal.

Digital mobile telephones operating in cellular networks are quickly becoming the most important personal communication media. Communication in a cellular network occurs via fixed base stations, and mobile telephone users are free to move with their phones within the coverage area of the system consisting of base station coverage areas, or cells. In addition to mobile phones, many kinds of other terminals may also be used in cellular networks, but below we will use the mobile telephone as an example.

Pricing of calls is based on an agreement between a user and network operator. From the point of view of competition between operators it is preferable that an operator be able to offer different pricing systems amongst which a suitable alternative can be selected for each user. One known pricing system is the so-called home area pricing, in which a user (or rather his or her terminal or the module intended for identifying the user) is assigned a so-called home area comprising the coverage areas of a certain base station or certain base stations and in which the user can make and receive calls at a cheaper rate. Then it is needed a method to determine whether or not the user is located in his or her home area. Usually the user also wants that his or her telephone somehow indicates whether or not the home area tariff is being applied, and preferably the telephone should make this indication while in the idle mode, ie. when no telephone connection exists at the telephone.

It is known several methods to implement said home area detection and tariff indication. In one system, a telephone listens to the identification code, or CellId parameter, of the base station in the coverage area of which it is located and compares that code with the list of home area base stations, stored in the subscriber identity module (SIM) of the telephone (terms related to the GSM system can here and below be generalized to relate to other systems as well, where applicable). In a second system, an alphanumeric code is transmitted via base stations in the so-called cell broadcast format, and that code may be, for example, the name and/or postal code of a town or city which will be provided directly on the display of a telephone, whereby the user shall determine whether or not he or she is in the home area or not. A third system is also based on said cell broadcast, but there each base station sends its geographical coordinates to the telephone. The home coordinates of the telephone and the radius of the home area are stored in the telephone, preferably in its SIM. The data processing unit of the telephone calculates the geometrical distance between the base station coordinates and the coordinates stored in the SIM, and if the distance is smaller than said home area radius, the telephone concludes that it is in the home area.

There are some problems involved in the prior art systems described above. In the first system, in which the identification codes of the home area base stations are stored in the telephone memory, the list has to be revised every time that a new base station is installed in the home area or the operation of the base stations is otherwise changed. The wider the home area, the more frequent the need for revision, because in a wide area there will be changes more frequently than in a small area. From the point of view of the network operator the updating work gets more laborious as the number of home area users in an area gets bigger. The memory capacity of the SIM is also limited and in an area with heavy traffic there are so many base stations that the home area base station list easily becomes very long. A CellId parameter of a base station cannot be used in other base stations to enlarge the home area of a user since then also the home areas of all the other users registered in the same home area would be enlarged even if their agreements only covered the original home area. The second system primarily puts a strain on the user's memory, because a wide home area may mean many alphanumeric home area codes to memorize. In addition, if the user is assigned several zones with different tariffs, it easily becomes an overwhelming task to remember all the relevant details. In the third system, the home area always constitutes a circle around the home point, which is not practical in all cases.

SUMMARY OF THE INVENTION

It is an object of this invention to provide a method for determining the base station specific special functions of a mobile telephone in an easy and flexible manner. It is also an object of the invention to provide a method with which it can be indicated to the user of a telephone whether a special function is available to him or her.

The objects are achieved by using both in the telephone and in the message sent by the base station character sequences, combining of which in the telephone in a manner according to the invention yields a result on the basis of which it can be concluded whether or not the user and his or her phone have access to a given special function.

It is characteristic of the method according to the invention, in which the base station sends a message to a radio communication device, that said device selects on the basis of a second character sequence stored in storage means at its disposal some of the characters in said first character sequence for making deductions and determines on the basis of the comparison between the selected characters whether a particular first service is available.

The invention is also related to base station equipment and a radio communication device to implement the method according to the invention. It is characteristic of cellular network base station equipment according to the invention, which includes means for transmitting a cell broadcast type transmission, that it also includes means for adding a base station specific bit sequence to said cell broadcast type transmission to determine in the radio communication device of said cellular network, by comparing individual characters in said bit sequence, whether a particular service is available. It is characteristic of the radio communication device according to the invention, which includes means for receiving a cell broadcast type transmission and storage means for storing character sequences, that it also includes means for selecting characters from a base station and/or area specific first and/or third character sequence included in said cell broadcast type transmission on the basis of a second and/or fourth character sequence stored in said storage means, and for making deductions on the basis of said selected characters in order to determine whether a particular service is available.

The invention is based on the idea that comparing a first character sequence sent by a base station and received by a radio communication device, or terminal, with a second character sequence stored in the terminal results in correct base station specific indication when said character sequences and their comparison are arranged so that they can be processed one character at a time. This arrangement will be described in detail later in this document. In principle, said character sequences may be any signals that have a measure in some dimension, such as analog frequency or amplitude modulated signals or digital bit sequences. Since in a digital cellular network both the base station and the terminal are digital devices, the natural choice for character sequences are binary numbers that contain a certain number of bits. The number of bits as such is not a significant factor in the invention, but it has an effect on the range of deduction possibilities obtained with the method of the invention.

BRIEF DESCRIPTION OF THE DRAWING

Below, the invention is described in detail with reference to the attached drawing, in which.

Corresponding parts in the figures are marked with the same reference numbers.

DETAILED DESCRIPTION OF THE INVENTION

By way of example, in the following embodiments the terminal is a mobile telephone and for reasons of simplicity it is assumed that there are 8 bits both in the first character sequence sent by the base station and received by the phone and in the second character sequence stored in the phone (or in storage means used by the phone). The final number of bits can be determined using an analysis taking into account the need for different variations when a given network operator is trying to Establish a particular service. An advantageous number could be 16 bits, for example.

Figure 1:
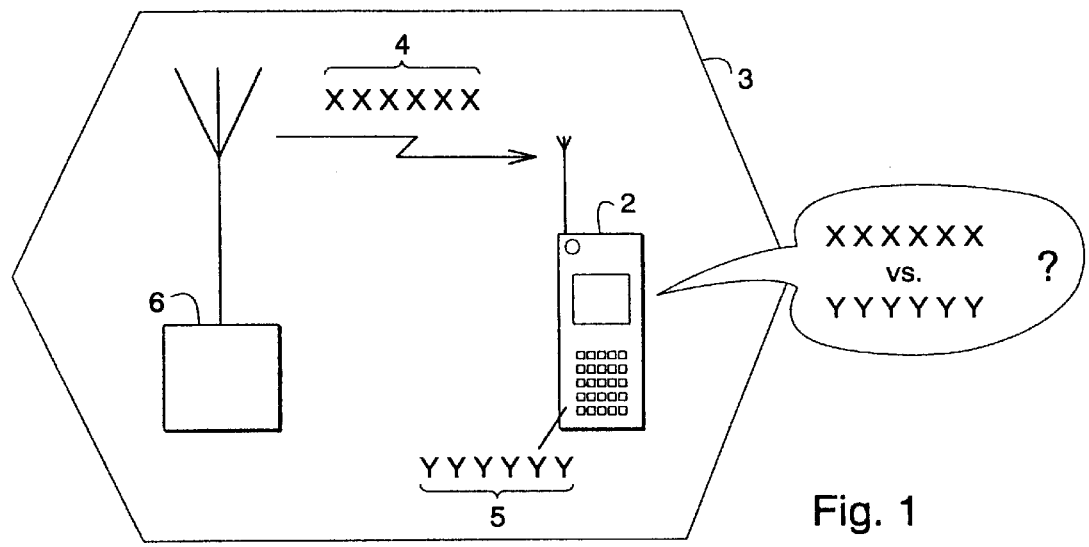
FIG. 1 illustrates the principle of the invention in general.

With the power on, a cellular mobile phone 2 is receiving in a manner which is known and in accordance with FIG. 1 messages sent by a base station 6 which can be received throughout the whole coverage area 3, even when the phone 2 is in the so-called standby state, ie. when no telephone connection is established to the phone. In the method according to the invention, the base station 6 transmits in a manner which is known, ie. as a so-called cell broadcast, a first character sequence 4. The telephone 2 receives it and compares it with a second character sequence 5 stored in the phone, preferably in its SIM. On the basis of the comparison the phone concludes whether a local special function, such as home area pricing, is applied.

Figure 2A:
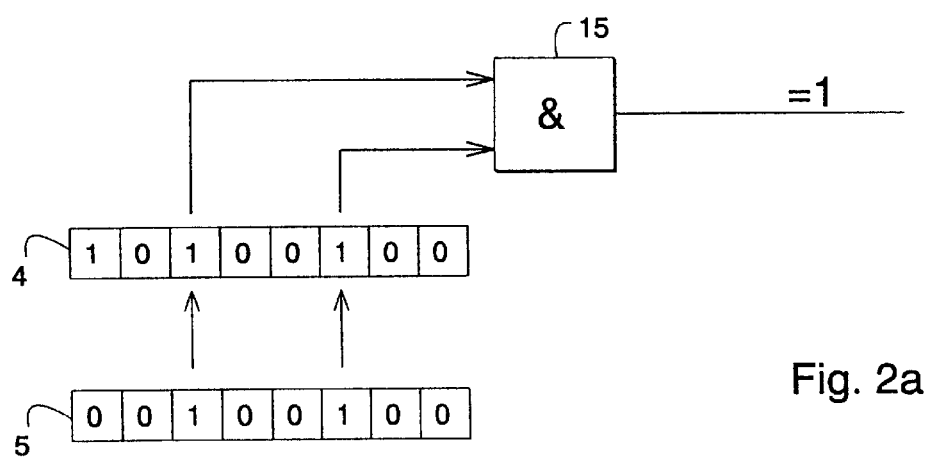
FIGS. 2a and 2b illustrate a first embodiment according to the invention.
Figure 2B:
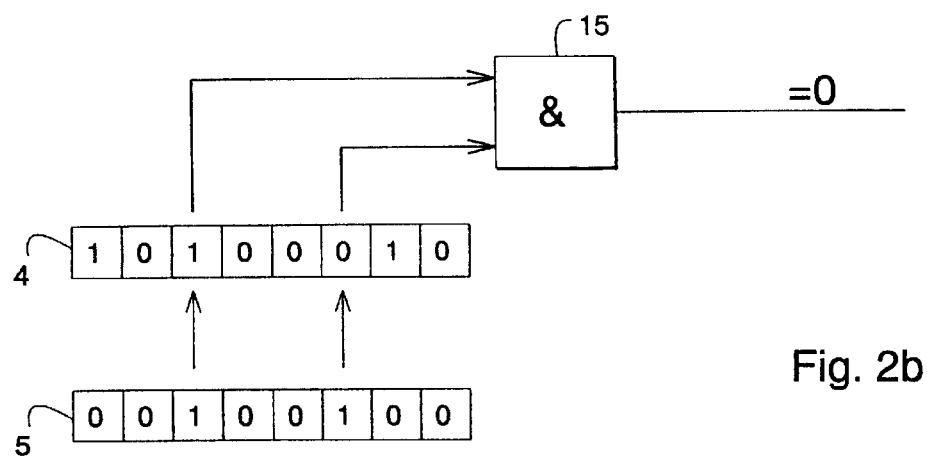

The comparison of character sequences 4 and 5 can be performed in many different ways within the scope of the inventive idea and the claims set forth later in this document. The invention differs from prior art especially in that the character sequences 4 and 5 are character sequences, advantageously binary numbers, that can be processed one character at a time. In a first embodiment of the invention, depicted in FIGS. 2a and 2b, a telephone performs a logic AND function 15 for all those bits in a first character sequence 4 that have a one in the corresponding position in a second character sequence 5. Such an operation, in which a second bit sequence determines which of the bits of a first bit sequence are taken under examination, is generally called masking and the second bit sequence, in this case the character sequence 5 stored in the mobile phone, is called a bit mask. The logic AND function 15 produces the result 1 if there is a 1 also in the corresponding bit positions of character sequence 4 (FIG. 2a), and 0, if there is a 0 in at least one corresponding bit position of character sequence 4 (FIG. 2b).

Figure 3A:
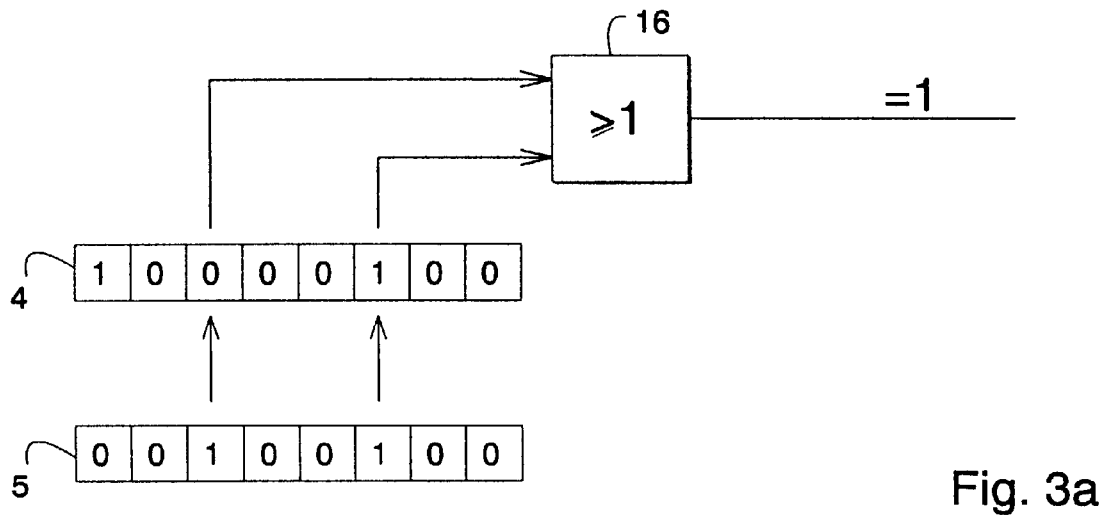
FIGS. 3a and 3b illustrate a second embodiment according to the invention.
Figure 3B:
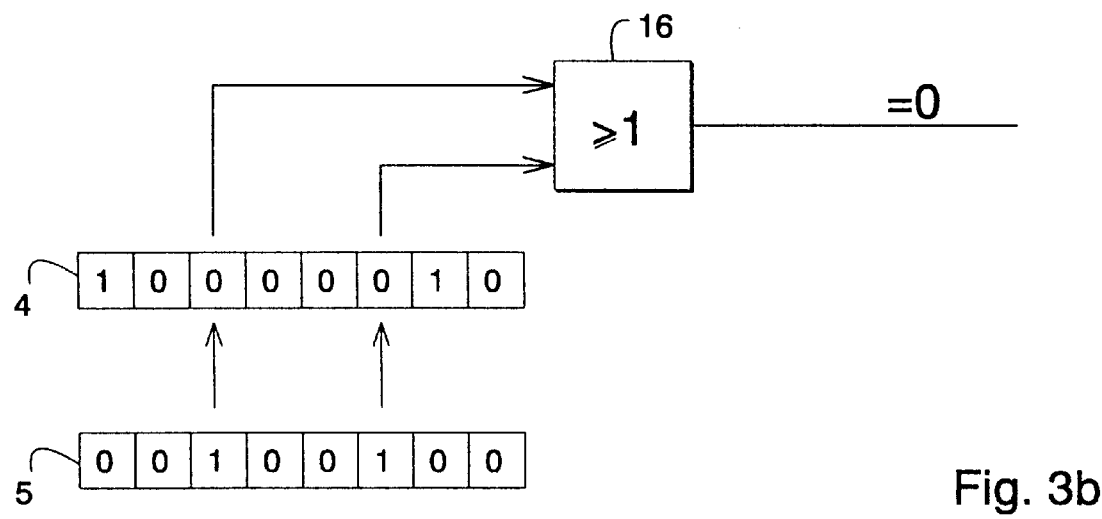

In a second embodiment of the invention, depicted in FIGS. 3a and 3b, a telephone performs a logic OR function 16 for all those bits in a first character sequence 4 that have a one in the corresponding position in a second character sequence 5. The masking operation is thus similar to the one performed in the first embodiment, but the logic OR function 16 produces the result 1, if there is a 1 in at least one corresponding bit position of the first character sequence (FIG. 3a), and 0 only if there is a 0 in all corresponding bit positions of the first character sequence (FIG. 3b).

In the first and second embodiments discussed above, the value of the logic function 15, 16 performed by the telephone advantageously corresponds to the home area so that function value 1 indicates that the user is in the home area and function value 0 indicates that the user is not in the home area. For this purpose, the character sequence 5 stored in the storage means of the telephone is on the basis of an agreement between the user and operator selected in such a way that its 1 bits (so-called set bits) are in such positions that in the cell broadcast messages of the base stations in the intended home area there is either a 1 bit in all corresponding positions (first embodiment, FIGS. 2a and 2b) or a 1 bit in at least one corresponding position (second embodiment, FIGS. 3a and 3b).

Information about the fact whether or not the user is in the home area, ie. whether the logic function has the value 1, can be easily conveyed to the user on the display of the mobile phone by means which are known to one skilled in the art. The first and second embodiments differ from each other in that if there are several 1 bits in the second character sequence 5 stored in the phone, the potential number of base station specific character sequences corresponding to the home area is in the first embodiment significantly smaller than in the second embodiment since in the second embodiment one "matching" bit in the first character sequence is enough. By creating more complex recognition algorithms (e.g. "if any 2 of the first four bits in the first character sequence are 1") it is possible to add various recognition possibilities.

Since in the method according to the invention the character sequences are examined one at a time (in the embodiments discussed above the telephone examines only those bits in the received first character sequence that have a 1 in the corresponding positions in the second character sequence stored in the memory of the telephone), the method according to the invention provides flexible ways to easily extend and modify both the network and the user specific regional service. Let us assume, for example, that the coverage area of a network is extended by building a new base station between two existing base stations and the coverage area of the new base station for the most part overlaps the coverage areas of the old base stations. Then the users with a regional agreement based on the coverage area of one or both of the old base stations have the right to require the same regional service also for calls transmitted via the new base station. When the operator sets the new base station to send a character sequence, or combination, obtained from the bits of the character sequences of the old base stations with a logic OR function with a one in all those positions in which there is a one in the character sequence of either or both of the old base stations, he extends the regional service based on the character sequence sent by either of the base stations also into the coverage area of the new base station without any updates to the users' phones or their user modules or other storage means.

Figure 4A:
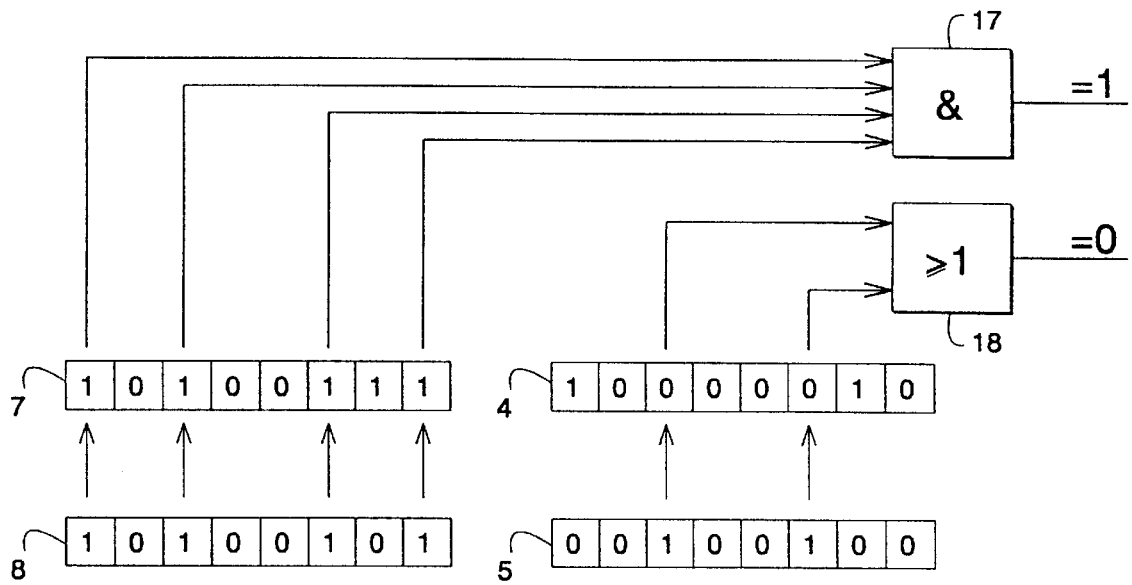
FIGS. 4a and 4b illustrate a third embodiment according to the invention.
Figure 4B:
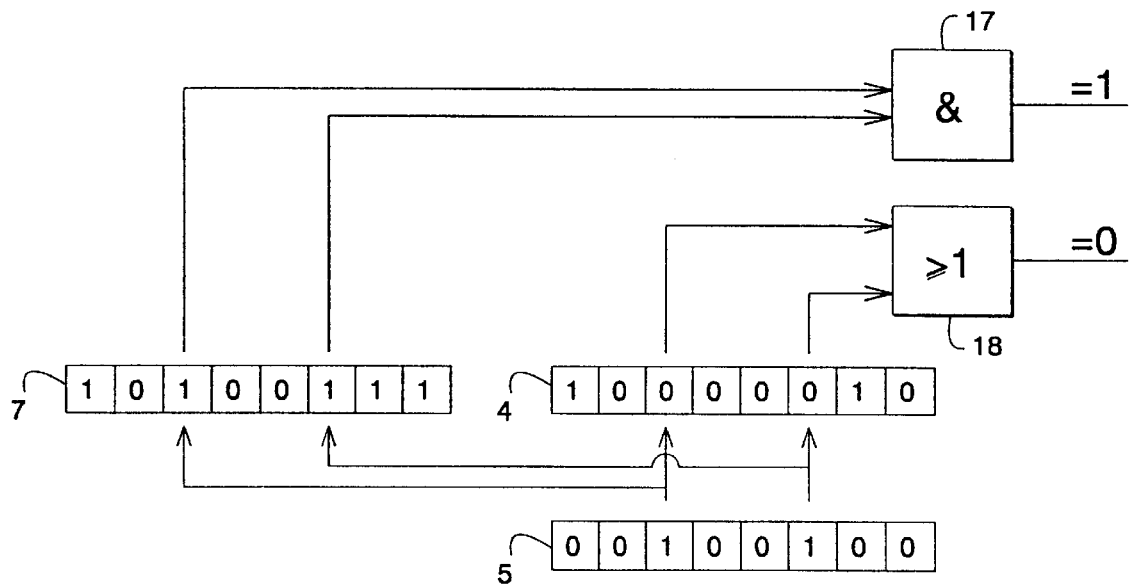

The applicability of the invention can be substantially extended in a third embodiment of the invention, in which base stations transmit, in addition to the base station specific character sequence, an area code determined by a larger area, which advantageously is a character sequence similar to the base station specific character sequence and which hereafter will be called a third character sequence. This embodiment is illustrated in FIGS. 4a and 4b. The character sequences sent by the base station and received by the phone are the base station specific 4 and regional 7 character sequence. The telephone compares the regional character sequence 7 which it has received either to the fourth character sequence 8 stored in the memory (FIG. 4a) or to the same character sequence 5 to which it compares the first character sequence 4 (FIG. 4b). The comparison constitutes a same kind of masking as above and the function 17 used in the deduction performed on the basis of the bits examined can be the same as or different than the function 18 used for comparing the first 4 and the second 5 character sequences.

Figure 5:
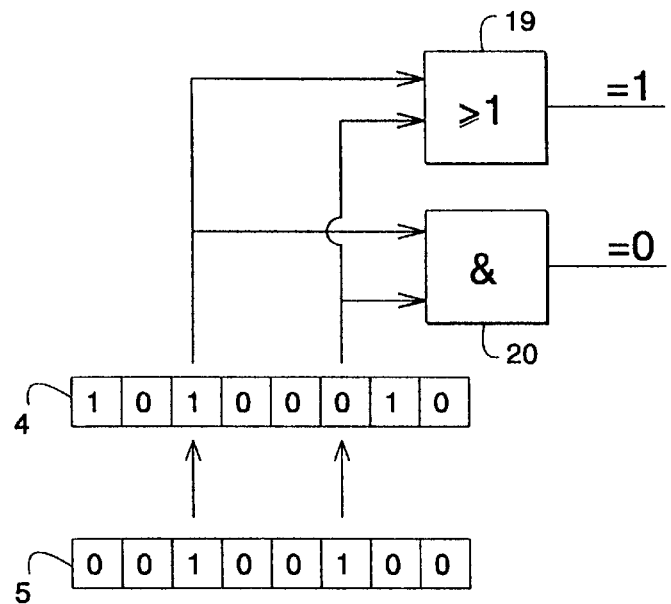
FIG. 5 illustrates a fourth embodiment according to the invention.

Yet another arrangement can be implemented in a fourth embodiment according to FIG. 5, using only the first 4 and the second 5 character sequences, where the telephone examines using an AND function 20 according to the first embodiment or another very restrictive function whether the user is in the area of his or her home base station and an OR function 19 according to the second embodiment or another less restrictive function whether the user is in a larger home area comprising more base stations.

In the third and fourth embodiments discussed above there may be at least four kinds of users in the same area. If the character sequences 5 and 8 stored in the phone of a user consist of zeroes only, then that user is not entitled to any special area specific service. A user whose character sequence 8 referring to the larger area consists of zeroes only, is entitled to a certain home area service in the smaller area, but not to the more extensive area service. A user whose character sequence 5 referring to the smaller area consists of zeroes only, may only use the area specific services defined for the larger area. A user who has ones in the character sequences corresponding to both the larger 8 and the smaller 5 area, may obtain e.g. certain area specific advantages in the larger area and some even more advantageous functions in his or her own home area. By further combining comparisons between the character sequences and using more complex recognition algorithms it is possible to define a very large number of different service alternatives. Indeed, one of the biggest advantages of the method according to the invention is the chance to have hierarchically arranged zonal division regarding services and their pricing in agreements between the user and the service provider.

Current base stations, too, usually transmit (in the GSM system that transmission is called a cell broadcast) a base station identifier which is a number. If examination and recognition of this number are combined with the operation of the phone, then the base station and area specific character sequences 4, 7 can be re-used somewhere else without having to take special steps in order to prevent the possibility that the user could, far away from his or her own home area, by chance arrive in an area where the phone would claim that the home area pricing is applied.

Figure 6:
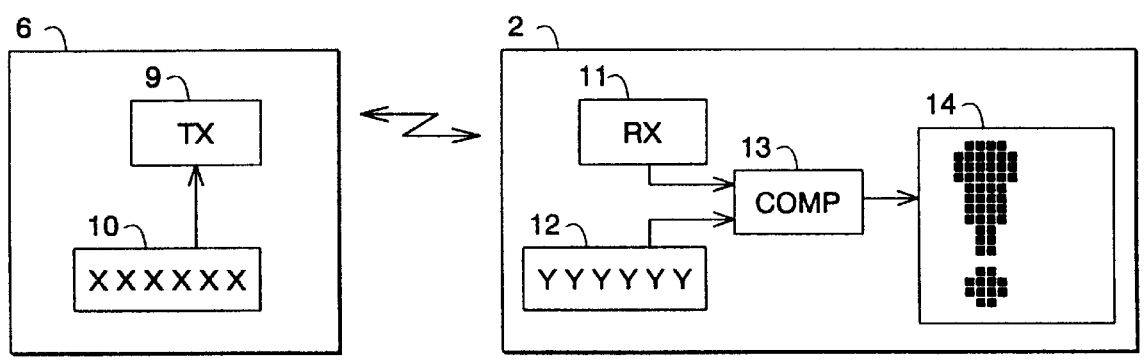
FIG. 6 illustrates an embodiment of equipment according to the invention in the form of a simple block diagram.

Only slight additions to the current configuration are required for equipment to apply the method according to the invention. FIG. 6 shows a simplified block diagram of the equipment. The base station 6 in a cellular network shall include a transmission part 9 which transmits a GSM cell broadcast type transmission, as well as means 10 for adding an area and/or base station specific character sequence to said transmission. Said character sequences are preferably 16-bit binary numbers. Those parts 11 of the terminal 2 that participate in the reception must be able to receive said (in the GSM system, cell broadcast type) transmissions, preferably while the terminal is in the standby state, and the storage means 12 available to the terminal must be capable of storing character sequences similar to those transmitted by the base station 6. In addition, the terminal shall include means 13 for comparing the received and stored character sequences with each other and for making deductions in the manner according to the invention, and preferably means 14 to indicate the results of the deductions to the user.

The method of the invention is applicable to a telecommunication system where a mobile station is allowed to hunt for the most favorable base station in terms of pricing or other services that are specific to base stations. Let us assume that a mobile station is able to receive cell broadcasts from several different base stations. In most prior art telecommunication systems the decision to route a call through a certain base station is based on radio propagation criteria. The decision-making algorithms are designed to pick the base station which can provide the most reliable radio communication link. If the mobile station performs the comparisons according to the invention between the cell-specific bit sequences it has received and its own bit mask sequences, it may find out that one of the available base stations would offer cheaper rates or other more favorable services. The mobile station may then route an existing call or a call establishment procedure to that base station even if the quality of communication is thus lowered in comparison to another base station with a stronger signal but higher rates. A natural prerequisite is that the favored base station is able to provide a minimum level of communication quality.

Above it has been described how service definitions based on the comparison of character sequences are divided on a geographical basis. However, there is no reason why the same inventive idea should not be extended to temporal variation, for example. Then e.g. the character sequences transmitted by base stations would change according to the time of day, which would require no new functions in mobile phones in addition to the comparison functions described above. Neither would the user be required to learn anything new, because the mobile phone would, according to the embodiments discussed above, indicate to the user whether a special service is available or not. By suitably combining geographical and temporal division it is possible to achieve with the method according to the invention very extensive variation possibilities in the range of services provided to users, which is a significant advantage in the competion between operators for the growing market of mobile communications.

What is claimed is:

1. A method for determining in a radio communication device an availability of services related to a use of said radio communication device in a cellular network, wherein said network includes a base station, and said radio communication device includes storage means, and said base station repeatedly transmits a message, said method including steps of:

including within said message a first character sequence;

storing a second character sequence in said storage means;

selecting by said radio communication device on the basis of said second character sequence some of the characters in said first character sequence;

comparing selected characters of said first sequence with corresponding characters of said second sequence to obtain a comparison;

making a determination on the basis of said comparison as to whether a particular first service is applicable; and wherein said selecting step is accomplished by a logic process responsive to individual characters of said second sequence for selecting a portion, but not all, of the characters of said first sequence to enable said selecting process to operate as a masking process wherein said second sequence serves as a mask for selecting characters in said first sequence.

2. The method of claim 1, further comprising a step, subsequent to said determination of indicating, by said mobile station to a user, whether said first service is applicable.

3. The method of claim 1, wherein said first character sequence consists of logic 1 and 0 symbols and said comparison between selected characters is a logic function.

4. The method of claim 3, wherein said logic function is an AND function.

5. The method of claim 3, wherein said logic function is an OR function.

6. The method of claim 1, further comprising a step of determining by said radio communication device, on the basis of comparison of selected characters, using a second comparison method, whether a particular second service is applicable.

7. The method of claim 1, wherein said message also includes a third character sequence, and said radio communication device selects on the basis of the second or a fourth character sequence stored in said storage means some of the characters in said third character sequence; and wherein said radio communication device determines on the basis of selected characters of the third character sequence whether a particular third service is applicable.

8. The method of claim 1, wherein said message also includes the number of said base station, and said radio communication device also determines on the basis of that number whether any one of said services is applicable.

9. The method of claim 1, further comprising a step of hierarchically arranging the applicability of said services by geographical areas so that a first service is applicable in a first area and a second service is applicable in a second area which at least partly is included in said first area.

10. The method of claim 1, further comprising a step of transmitting repeatedly at least one of the character sequences included in the message by said base station; and regularly changing said at least one of the character sequences of the message according to the time of day.

11. In a mobile station of a cellular network, a method for choosing a certain base station among a plurality of base stations, in which method the mobile station receives a separate repeatedly transmitted message from each of the plurality of base stations, the method comprising the steps of:

including in each of the repeatedly transmitted messages a base station specific character sequence, said base station sequence being a first character sequence;

storing a second character sequence in a memory of said mobile station;

selecting, by said mobile station on the basis of said second character sequence, some of the characters in said base station specific character sequences;

comparing selected characters of said specific character sequences with corresponding characters of said second sequence to obtain a comparison;

making a determination on the basis of said comparison between the selected characters as to which subset of said base stations a particular first service is applicable, and as to which one from said subset of base stations it is most advantageous to apply said first service; and wherein said selecting step is accomplished by a logic process responsive to individual characters of said second sequence for selecting a portion, but not all, of the characters of said first sequence to enable said selecting step to operate as a masking process wherein said second sequence serves as a mask for selecting characters in said first sequence.

12. Base station equipment for use in a cellular network including means for transmitting a message; means for adding a base station specific bit sequence to said message for the purpose of determining, in a radio communication device in said cellular network, the applicability of a particular service on the basis of comparison of certain characters in said bit sequence; and means for making said comparison, said base station sequence being a first character sequence; and wherein said radio communication device stores a second character sequence, and said comparison means includes logic means responsive to individual characters of said second sequence for selecting a portion, but not all, of the characters of said first sequence to enable said comparison means to operate by a masking operation wherein said second sequence serves as a mask for selecting characters in said first sequence.

13. Base station equipment according to claim 12, further comprising means for adding a base station group specific bit sequence to said message for the purpose of determining, in a radio communication device in said cellular network, the applicability of a particular service on the basis of comparison of certain characters in said base station group specific bit sequence.

14. A radio communication device for use in a cellular network including means for receiving a message and storage means for storing character sequences, and means for selecting characters from a base station and/or area specific first character sequence included in said message on the basis of a second character sequence stored in said storage means for determining, on the basis of said selected characters whether a particular service is applicable; and wherein said selecting means includes logic means responsive to individual characters of said second sequence for selecting a portion, but not all, of the characters of said first sequence to enable said selecting means to operate by a masking operation wherein said second sequence serves as a mask for selecting characters in said first sequence.

15. The radio communication device of claim 14, further comprising means for giving an indication to a user about whether said service is applicable.

16. The radio communication device of claim 15, wherein the radio communication device is a mobile telephone in a digital cellular network.

* * * * *